United States Patent [19]

Alexander

[11] 4,318,394

[45] Mar. 9, 1982

[54] SOLAR ENERGY CONCENTRATOR

[76] Inventor: William C. Alexander, 1403 Cardinal Hill, Austin, Tex. 78758

[21] Appl. No.: 111,202

[22] Filed: Jan. 11, 1980

[51] Int. Cl.³ .................................................. F24J 3/02
[52] U.S. Cl. ................................ 126/438; 126/424; 126/425; 250/203 R; 350/288; 350/289; 350/320
[58] Field of Search ............... 126/438, 425, 451, 439, 126/424; 250/203 R; 353/3; 350/288, 289, 292, 295, 320

[56] References Cited

U.S. PATENT DOCUMENTS

| | | | |
|---|---|---|---|
| 3,868,823 | 3/1975 | Russell, Jr. et al. | 126/425 X |
| 3,905,352 | 9/1975 | Jahn . | |
| 3,972,600 | 8/1976 | Cobarg | 350/295 |
| 4,038,971 | 8/1977 | Bezborodko . | |
| 4,046,462 | 9/1977 | Fletcher et al. . | |
| 4,056,309 | 11/1977 | Harbison et al. . | |
| 4,056,313 | 11/1977 | Arbogast . | |
| 4,068,653 | 1/1978 | Bourdon et al. | 126/425 |
| 4,086,485 | 4/1978 | Kaplow et al. | 126/425 |
| 4,093,351 | 6/1978 | Perkins et al. | 350/295 X |
| 4,106,480 | 8/1978 | Lyon et al. | 126/438 |
| 4,110,010 | 8/1978 | Hilton . | |
| 4,131,336 | 12/1978 | Miller et al. . | |
| 4,134,387 | 1/1979 | Tornstrom . | |
| 4,137,897 | 2/1979 | Moore . | |
| 4,147,414 | 4/1979 | Raser | 126/438 X |
| 4,148,564 | 4/1979 | Devin et al. . | |
| 4,153,039 | 5/1979 | Carroll . | |
| 4,158,356 | 6/1979 | Wininger . | |
| 4,159,710 | 7/1979 | Prast . | |
| 4,225,781 | 9/1980 | Hammons | 250/203 R |
| 4,237,864 | 12/1980 | Kravitz | 126/438 X |

OTHER PUBLICATIONS

"A 2.7 Meter Diameter Vacuum Film Solar Concentrator", *Applied Solar Energy*, S. V. Stardobtsev, G. Ya. Umarov and N. V. Kordub, vol. 1, No. 1, Jan.-Feb. 1965, pp. 16-18.

"Experimental Investigation of Certain Properties of Parabolic Cylindrical Inflatable Film Concentrators", *Applied Solar Energy*, G. Ya. Umarov, Z. Dzhalolv and A. Abduazizov, vol. 4, No. 5, 1968, pp. 27-29.

"Stationary Concentrating Reflector cum Tracking Absorber Solar Energy Collector: Optical Design Characteristics", *Applied Optics*, Steward and Kreith, 14, No. 7, p. 1509.

"Analysis of a Flat Mirror Solar Concentrator", Collier and Matthew, ASME, 76-11 WA/HT-11 (1976).

*Tech. Report,* Gulf General Atomics Corp., J. L. Russel (1974).

*Primary Examiner*—Larry Jones
*Attorney, Agent, or Firm*—Pravel, Gambrell, Hewitt, Kirk, Kimball & Dodge

[57] ABSTRACT

A solar energy concentrator is provided which includes a flexible reflective surface to focus solar flux on absorber tubes. The surface is mounted above a plurality of partially evacuated chambers. As the relative position between the sun and the concentrator change, the position of the absorber tubes and curvature of the reflective surface are changed to maintain an optimum reflective surface curvature for solar energy concentration.

18 Claims, 12 Drawing Figures

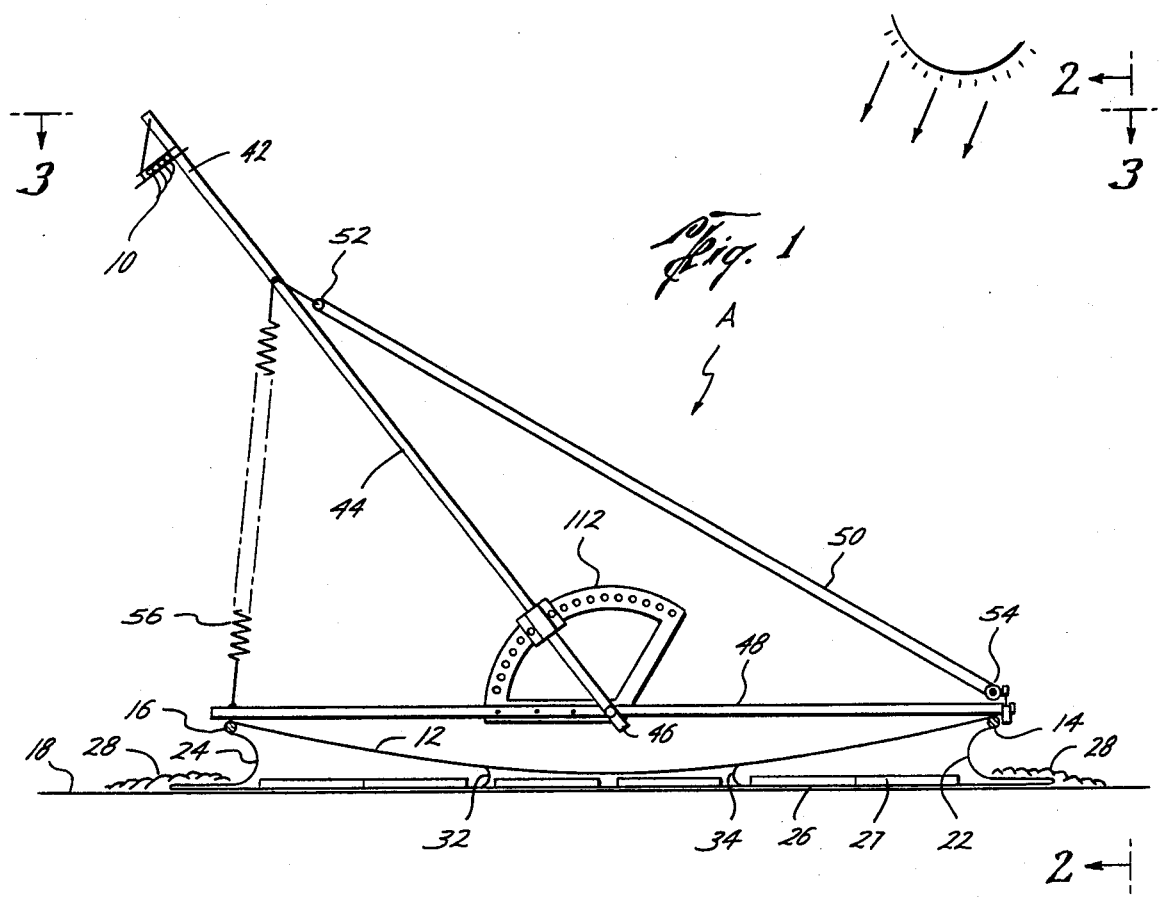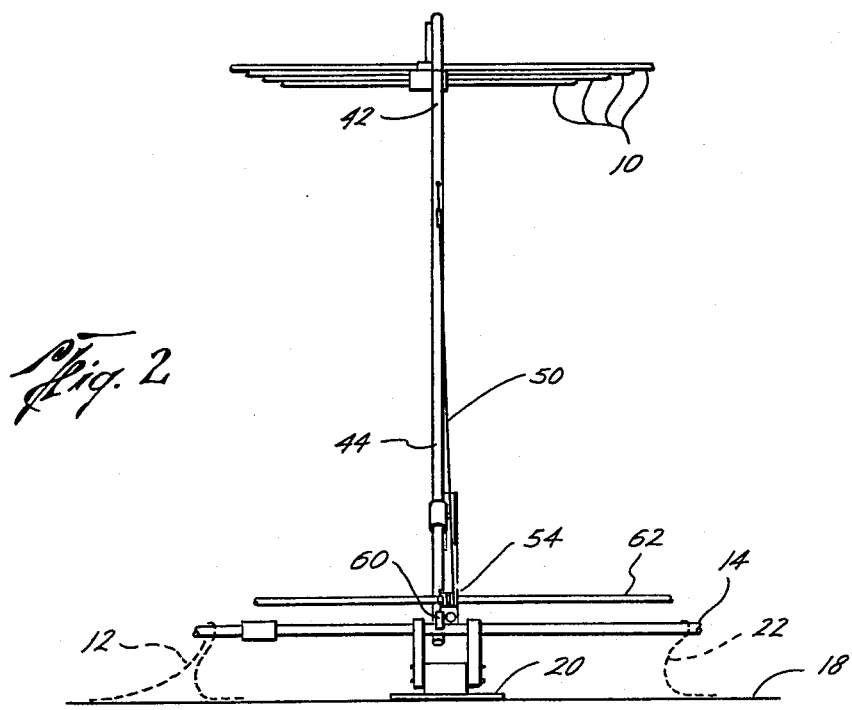

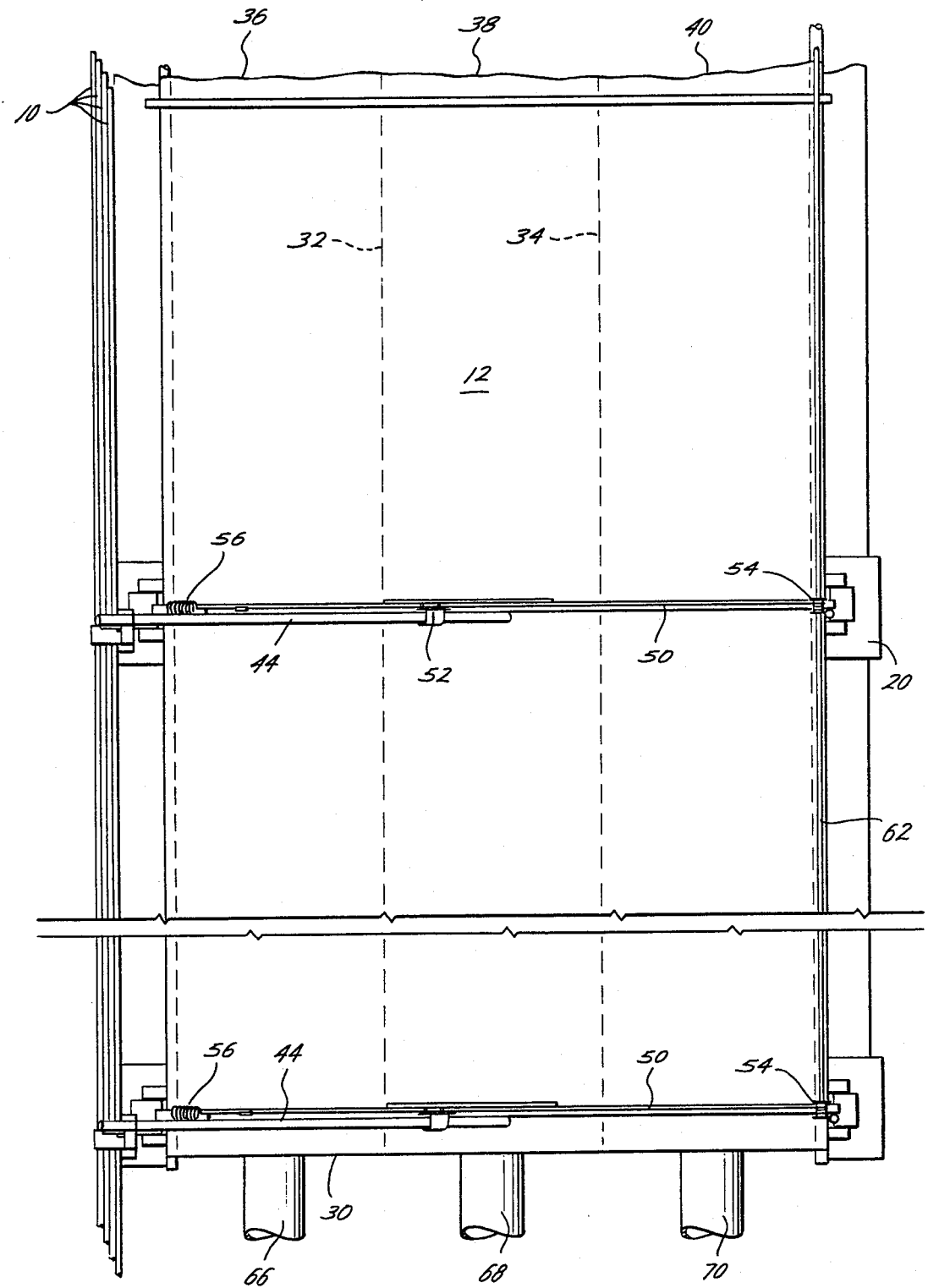

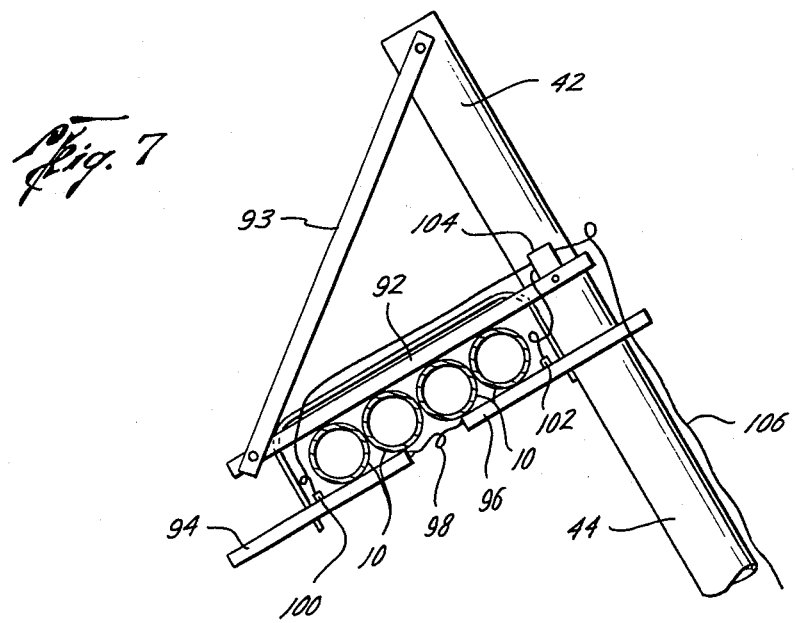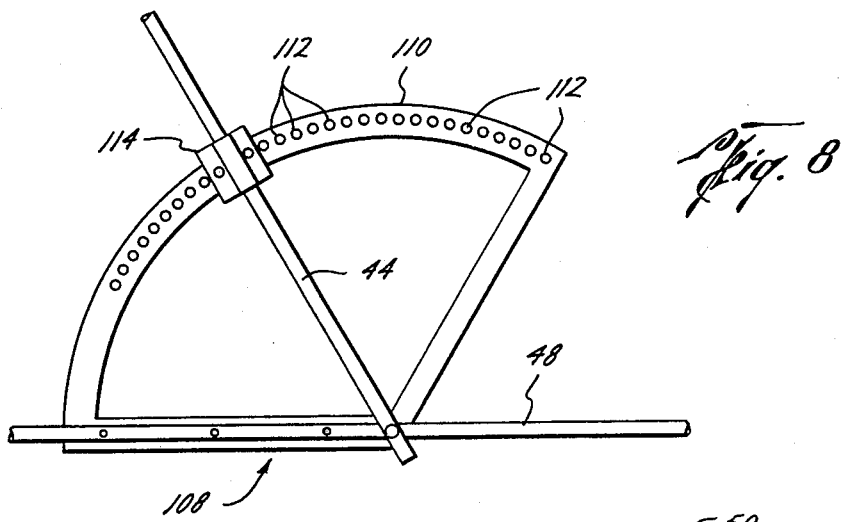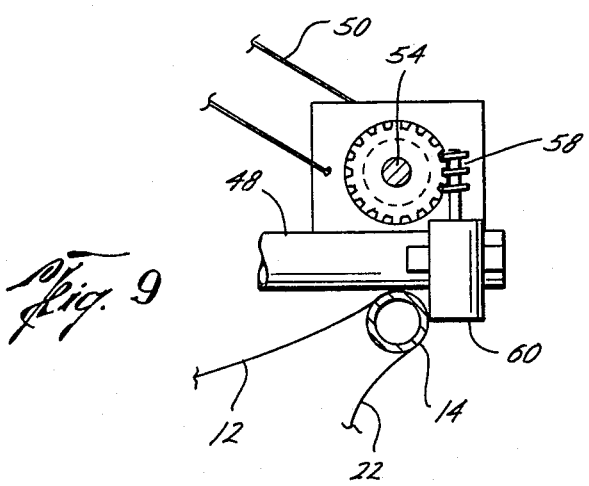

SOLAR ENERGY CONCENTRATOR

BACKGROUND

The present invention relates to solar energy concentration.

U.S. Pat. No. 4,046,462 and NASA Tech Briefs, Spring, 1979, pages 44 and 45, both disclosed a solar concentrator with a flexible, reflective surface. In order to adjust the curvature of this reflective surface, a non-uniform differential pressure was applied to the reflective surface. The differential pressure was made non-uniform by either making the thickness of a membrane on which the reflective surface was mounted non-uniform by spraying a dissolved plastic on certain portions of the membrane to make the membrane non-uniform in thickness or by application of localized electrostatic or magnetic pressure to the membrane. Other patents, such as U.S. Pat. Nos. 4,134,387 and 4,056,309 utilized flexible, reflective surfaces, but supported them with rigid surfaces so that their curvature could be adjusted only by changing support surfaces.

Other solar concentrators known to the inventor of general interest but, so far as is known, not using flexible reflective surfaces were U.S. Pat. Nos. 3,905,352, 4,038,971, 4,056,313, 4,110,010, 4,131,336, 4,137,897, 4,148,564, 4,153,039, 4,158,356, 4,159,710.

Other publications relating to solar energy in general known to applicant are:

"Proceedings," Solar Energy Conference, C. S. Taylor;

"*Applied Solar Energy: An Introduction,*" A. B. Meinel and M. P. Meinel;

"A 2.7 Meter Diameter Vacuum Film Solar Concentrator," *Applied Solar Energy,* S. V. Stardobtsev, G. Ya. Umarov and N. V. Kordub, Volume 1, No. 1, Jan.-Feb. 1965, pp. 16–18;

"Experimental Investigation of Certain Properties of Parabolic Cylindrical Inflatable Film Concentrators," G Ya. Umarov, Z. Dzhalolv, and A. Abduazizov, *Applied Solar Energy,* Volume 4, No. 5, 1968, pp. 27–29;

*Appl. Opt.,* W. G. Steward and F. Kreith, 14, No. 7, p. 1509;

*Tech. Rept.,* Gulf General Atomics Corp., J. L. Russel (1974);

"Analysis of a Flat Mirror Solar Concentrator," R. K. Collier and G. K. Matthew, ASME, 76-WA/HT-11 (1976).

SUMMARY OF INVENTION

Briefly, the present invention provides a new and improved solar energy apparatus and method. A solar energy absorber which absorbs solar flux is mounted near a flexible reflective surface. The reflective surface concentrates solar flux onto the absorber, and the position of the absorber is moved with respect to the reflective surface according to the flux distribution of solar flux received. Thus, as the relative position of the reflective surface with respect to the sun moves due to movement of the earth, the absorber is moved so as to maximize incident heat flux on the absorber. As the absorber is moved, the shape of the flexible reflective surface is adjusted so as to obtain optimum solar flux concentration on the absorber. Air pressure differentials across the reflective surface generate and control the shape of the reflective surface.

BRIEF DESCRIPTION OF THE DRAWINGS

FIG. 1 is an elevation view, taken partly in cross-section, of an apparatus according to the present invention;

FIG. 2 is a view taken along the lines 2—2 of FIG. 1;

FIG. 3 is a plan view taken along the lines 3—3 of FIG. 1;

FIGS. 4, 5, 6, 7, 8 and 9 are views of portions of the apparatus of FIG. 1;

DESCRIPTION OF THE PREFERRED EMBODIMENT

Figure 4:
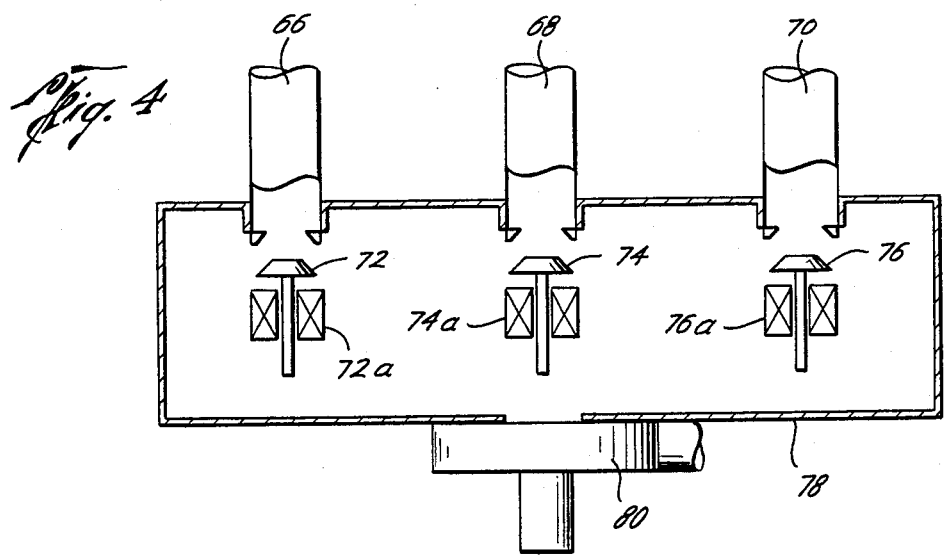

In the drawings, the letter A designates generally an apparatus according to the present invention for concentrating solar energy or flux on a plurality of solar flux absorber tubes 10. The apparatus A includes a flexible reflective surface 12 in the form of an elongate quadrilateral sheet of synthetic resin having a reflective surface of aluminum or other suitable reflective material. The reflective surface 12 is suspended between a pair of support tubes or members 14 and 16 which are mounted above a portion 18 of the earth's surface on plate members 20 (FIG. 3). The reflective surface is fairly long, a typical length being on the order of one hundred feet. The spaces below the support tubes 14 and 16 are closed by flexible walls 22 and 24 of a suitable synthetic resin and a floor sheet 26 of similar material extends along the earth's surface 18 below the flexible reflector surface 12. The surface 12, walls 22 and 24 and the floor sheet 26 are attached to each other along the length of the apparatus A so that a hermetically enclosed chamber 27 may be formed beneath the reflective surface 12. Dirt, as indicated at 28, or other suitable weights may be placed on the lower ends of the walls 22 and 24 for ballast, if desired. Dirt, or other suitable weights, are placed on the floor sheet 26 in order to hold it down against the pressure differential.

The chamber 27 beneath the reflective surface 12 is closed at each end of the apparatus A (FIG. 3) by a wall member 30 so that the chamber 27 is hermetically sealed against ambient atmospheric pressure. The chamber 27 is further subdivided by flexible separators, shown as 32 and 34, along the length of the chamber 27 so that the chamber 27 is divided into a plurality, such as three, of individual compartments 36, 38 and 40. The separators provide pressure isolation but exert negligible forces on the surface 12. As will be set forth, the pressure in the compartments 36, 38 and 40 is selectively controlled in accordance with the relative position of absorber tubes 10 and surface 12 to optimize the solar flux focused onto the absorber tubes 10.

The absorber tubes 10 contain a suitable fluid which circulates through the tubes 10 under influence of a pump and absorbs solar flux focused thereon by the reflective surface 12. The absorber tubes 10 are mounted at an upper end 42 of a pivotally movable support member 44. Suitable numbers of such support members are provided along the length of the absorber tubes 10 as required for support. The absorber support tubes 44 are each pivotally mounted at a lower end 46 to a cross-beam 48 mounted to extend between the support members 14 and 16. A positioning cable 50 passes over a pulley 52 mounted with the support tube 44.

A reel 54, movable in a manner to be set forth, also has the cable 50 passing thereover in order to control the position of the absorber tubes 10 with respect to the reflective surface 12 as the relative position of the sun changes due to the movement of the earth with respect to the sun. A spring 56 or other suitable resilient means extends between the support tube 44 and the tube 16 in order to retain the absorber tubes 10 in the desired position and balance the force exerted on the support tube 44 by the cable 50. The reel 54 is driven by a worm gear 58 (FIG. 9) in response to a reversible electric gear motor 60 to adjust the position of the absorber tubes 10 with respect to the surface 12. Preferably, each of the reels 54 associated with the support tubes 44 is interconnected by a common shaft 62 (FIG. 2).

Figure 10:
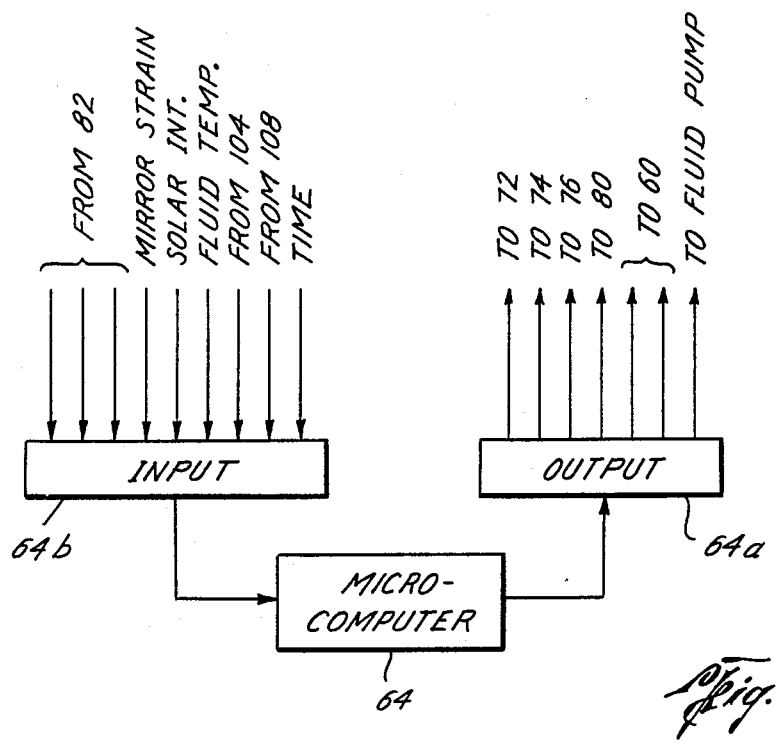
FIG. 10 is a schematic diagram of a control mechanism of the apparatus of the present invention.

The motor 60 is controlled by a computer 64 (FIG. 10) through an output buffer 64a in a manner to be set forth. Further, the pressure differential between the interior of each of chambers 36, 38 and 40 and ambient air pressure is selectively controlled to adjust the shape of the reflective surface 12 in accordance with the position of the absorber tubes 10 with respect to the surface 12 to maintain optimum and maximum solar flux on the absorber tubes 10. Both the relative curvature across each compartment and the relative width of the surface 12 are controlled by the various differential pressures. The relative width of the surface 12 is varied by the strain produced by the pressure differentials. Conduits 66, 68 and 70 extend from the chambers 36, 38 and 40, respectively at the end wall 30 of the apparatus A to valves 72, 74 and 76 or other suitable selectively actuated plug members. The valves 72, 74 and 76 are mounted within a chamber 78 (FIG. 4) in which the pressure is maintained at a desired reduced level by means of a blower or air pump 80. By selectively actuating different ones of the valves 72, 74 and 76 by means of the solenoid coils 72a, 74a, and 76a, respectively associated therewith, the pressure in the chambers 36, 38 and 40 may be selectively adjusted, controlled and regulated to adjust the surface configuration of the reflective surface 12 to maintain the optimum solar flux on the absorber tubes 10 during their movement as the relative position between the apparatus A and the sun change. It is also desirable to mount suitable strain gauges on the reflective surface 12 at suitable locations so that the strain on the surface 12 may be monitored and furnished to input buffer 64b of the computer 64.

Figure 5:
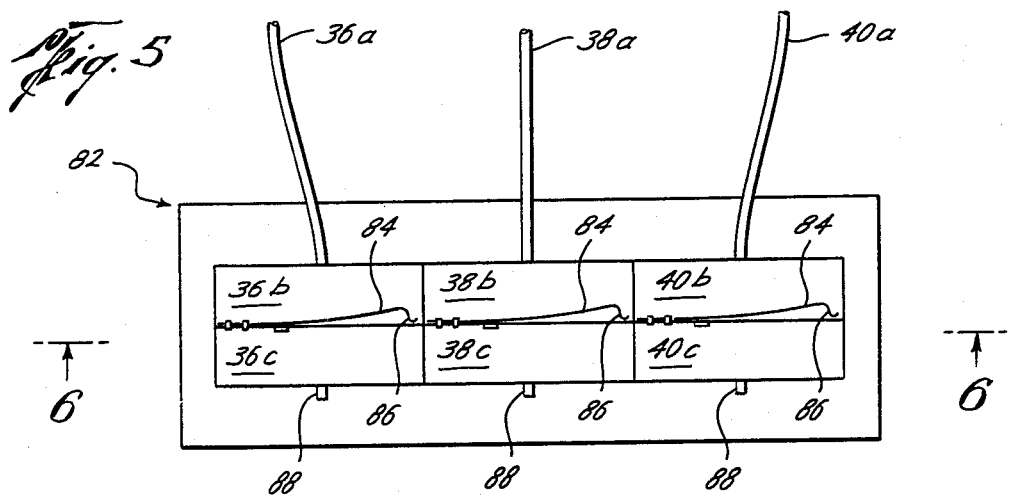
Figure 6:
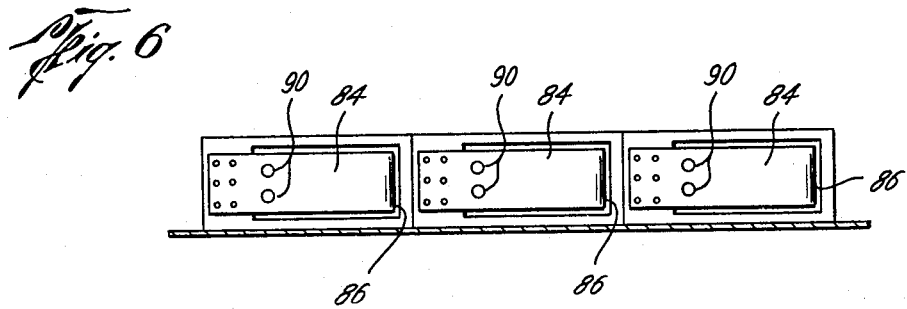

The pressure differential between the interior of the chambers 36, 38 and 40 and the exterior ambient air pressure is measured by a pressure sensor mechanism 82 (FIGS. 5 and 6). Tubes 36a, 38a and 40a connect the chambers 36, 38 and 40 to chambers 36b, 38b, and 40b, respectively. A flexible metal plate 84 and an end seal 86 form one wall of each of the chambers 36b, 38b and 40b. Chambers 36c, 38c and 40c are each subjected to ambient air pressure through individual inlets 88 so that the amount of flex of the metal plates 84 is an indication of the pressure differential between the interior of chambers 36, 38 and 40 and ambient air pressure. A plurality of strain gauges 90 are mounted with each of the plates 84 and provide an electrical indication of the amount of deflection of the plates and accordingly the pressure differential within the chambers 36, 38 and 40. The outputs from the strain gauges 90 are further provided to the computer 64 through an input buffer 64b.

The heat absorber tubes 10 are preferably mounted along their length under a heat shield member 92 (FIG. 7) extending outwardly from the upper end 42 of the support post 44 and are painted with a suitable type of black paint on the surface portions facing the reflective surface 12. The rear portions of the heat absorbers tubes 10 need not be painted. The shield member 92 is mounted with the top portion 42 of the post 44 by means of a bracket member 93a. Lower mounting rods 93b of a suitable metal, such as steel, extend outwardly from the support tube 44 and hold the heat absorber tubes 10 in position under the heat shield 92. Copper plates 94 and 96 are interconnected by a copper wire 98 to form a portion of an electrical circuit for sensing incident heat flux. Thermocouple wires 100 and 102 of the heat flux sensing circuit, such as strips of constantan wire or other suitable alloy are mounted with the plates 94 and 96 respectively and form a differential thermocouple which senses the incident heat flux at each side of the heat absorber tubes 10. The thermocouple wires 100 and 102 are electrically connected to a voltage comparator 104 so that a comparative reading between the incident heat flux on the absorber tubes 10 at each side thereof is obtained. The output from the voltage comparator is furnished by a conductor 106 to input buffer 64b of the computer 64.

The apparatus A further includes a mechanism 108 (FIG. 8) for detecting the position of the absorber tubes 10 with respect to the flexible reflective surface 12. Mounted with one of the cross beams 48 is an arcuate member 110 having a plurality of regularly spaced holes or apertures 112 along its length. Mounted with the support post 44 adjacent the location of the holes 112 is a bracket member 114 to which is attached a suitable light source so that light may pass through the holes 112 and be sensed by a photodetector mounted with the bracket 114 on an opposite side from the light source. As the absorber tubes 10 and post 44 move with respect to the reflective surface 12, pulses of light pass from the light source to the photodetector for each of the holes 112 past which the post 44 moves. The photodetector is electrically coupled to the input buffer 64b of computer 64 so that the number of light pulses may be counted and the position of the absorbers 10 with respect to the reflective surface 12 determined in the computer 64.

Figure 12:
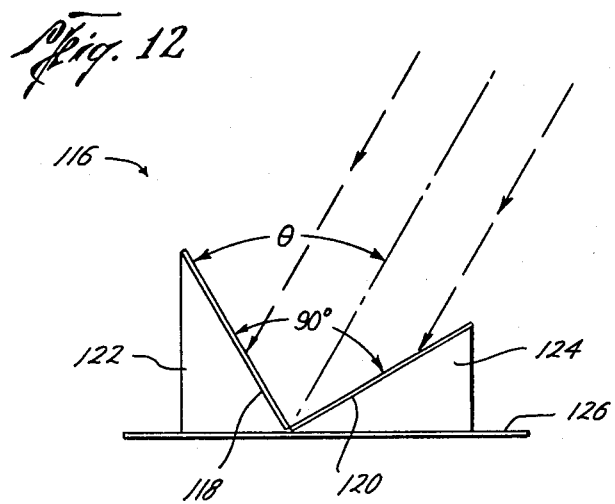
FIG. 12 is an initial position sensor for the apparatus of FIG. 1.

The apparatus A further includes an initial solar position sensor 116 (FIG. 12) including solar cells 118 and 120 mounted at right angles to each other on supports 122 and 124 on a base 126 near the apparatus such as at one end of the reflective surface 12 along the center axis thereof. The power output of the solar cells 118 and 120 is proportional to the amount of incoming sunlight incident thereon. The initial angle $\theta$ of the sun with respect to the reflective surface 12 is defined as follows:

$$\theta = \arctan \frac{[\text{power output of cell 118}]}{[\text{power output of cell 120}]}$$

The determination of the initial angle $\theta$ may be done in the computer 64 if desired.

Figure 11:
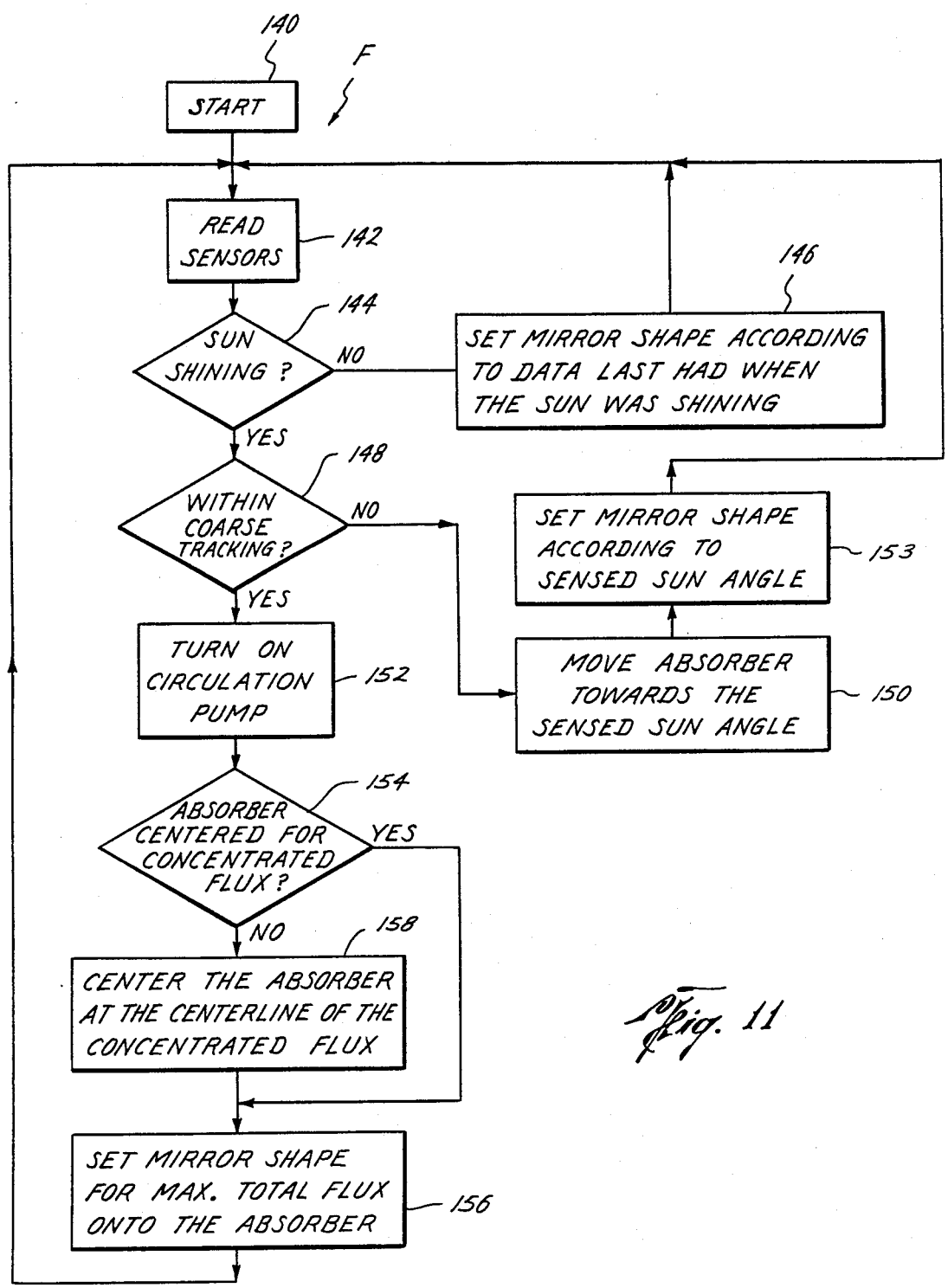
FIG. 11 is a schematic representation of the operating sequence of the control mechanism of FIG. 10.

The computer 64 may be in the form of a general purpose digital computer properly programmed or, alternatively, may be in the form of a special purpose, hardwired computer or in the form of a suitably programmed read only memory (PROM), if desired. A flowchart F (FIG. 11) sets forth the sequence of operation of the computer 64 in accordance with the present invention. The flowchart F sets forth the operating sequence in sufficient detail to enable a computer programmer or ordinary skill in the art to write a program in a suitable language such as FORTRAN or the like.

Upon receipt of the start instruction 140, an initial minimum solar intensity reading and specified acceptable tracking limits are read from the memory of computer 64 and control is transferred to an instruction 142 which causes the computer 64 to take initial readings of the pressures in the chamber 36, 38 and 40, the amount of strain in the reflective surface 12, the intensity of the solar flux as sensed by solar cells 110 and 120, the temperature of the fluid in the absorber tubes 10, and the outputs of the comparator 104 and the position detecting mechanism 108.

A decision instruction 144 determines whether, based on the solar intensity on solar sensor 120 and the initial solar intensity minimum, the sun is shining. If this is not the case, control is transferred to an instruction 146 which causes the computer 64 to provide output signals to the solenoids 72a, 74a and 76a so that the reflective surface 12 is set to the shape it had on the last instance when the sun was shining and control is transferred again to instruction 142. Alternatively, the computer 64 may be instructed to stop at this time, if desired.

If, during the performance of decision instruction 144, sufficient solar intensity is incident on the absorber tubes 10 to indicate that the sun is shining, control is transferred to a decision instruction 148. The computer 64 under control of decision instruction 148 makes a determination based on information received from the position detecting mechanism 108 and solar cells 118 and 120 as to whether the absorber tubes 10 are within specified tracking limits stored within the memory of computer 64. If this is not the case, control is transferred to an instruction 150 which causes the computer to activate the motor 60 and move the support arm 44 and absorber tubes 10 towards the sensed sun angle as indicated by the initial position detector mechanism 116. Control is then transferred to a decision instruction 152 which causes the computer 64 to adjust the shape of the reflective surfaces by means of activation of the valves 72, 74 and 76, at which time control is transferred back to the instruction 142.

In the event that a positive decision lis made during the performance of instructions 146, control is transferred to an instruction 152 which causes the computer 64 to activate the pump circulating fluid through absorber tubes 10. Control is then transferred to a decision instruction 154 which makes a determination, based on signals provided to the computer 64 from the comparator 104 as to whether the absorber tubes 10 are centered for concentrated flux. If a favorable decision is reached during performance of instruction 154, control is transferred to an instruction 156 which, by means of the valve 72, 74 and 76 adjusts the shape of the reflective surface 12 in order to achieve maximum total flux on the absorber tubes 10.

In the event that a negative decision is obtained during the performance a decision instruction 154 by the computer 64, control is transferred to an instruction 158 which causes the computer 64 through the motor 60 to adjust the position of the sensor tubes 10 with respect to the reflective surface 10 until an indication is provided by the comparator 104 of a concentrated flux reading. At such time, control is again transferred to the instruction 156 which causes the computer 64 through valve 72, 74 and 76 to adjust the shape of the reflective surface 12 according to the relative position of the absorber tubes 10. Control is then again transferred to the instruction 142.

During the course of the day, as the relative position of the apparatus A and the sun vary due to the rotation of the earth with respect to the sun, the computer 64 based on readings taken during the performance of instruction 142, moves the position of the absorber tubes 10 by means of the motor 60, during performance of the instruction 158, and adjusts the shape of the reflective surface 12 as the absorber tubes 10 are moved so that maximum total solar flux is focused onto the absorber tubes 10. Determination of the mirror shape for maximum total flux may be stored in the form of a library of relative pressure setting levels for the compartments 36, 38 and 40 and mirror surface strain stored in the memory of the computer 64 or may be determined by means of a computer program stored in computer 64 which determines pressure differential and beam position on absorber tubes 10 based on incident angle of incoming sunlight. Details of such a program are contained in applicant's master's thesis entitled: "Optical Concentration of Solar Energy by a Segmented-surface Vacuum Formable Quasi-Parabolic Trough", published August, 1979 by the University of Texas.

With the present invention, the specularly reflective surface 12 is placed between supports 14 and 16. The surface 12 is an elongate quadrilateral and support 14 and 16 represent lines running perpendicular to the plane of the drawing on which surface 12 is mounted. The surface 12 is thin enough so that bending movements in it are negligible. It is, however, thick enough to withstand tensile stresses. The linear distance between supports 14 and 16 is a predetermined value which may be fixed or variable. The length of the surface 12 may also be fixed or variable. However, at least one of the length of surface 12 or distance between supports 14 and 16 must be variable so that their ratio may be varied.

The space beneath the surface 12 is divided into any number of chambers, which may be any integer from one to a very large number. A typical value is from three to five.

Each chamber is pressure isolated from the others and from the exterior environment, allowing each chamber to have its own independently controlled pressure. The pressure isolation ideally causes no forces to be applied to the surface 12 at the junction points between chambers, but small but negligible forces are acceptable. The apparatus A can thus approximate any surface function which can be approximated by a function composed of circular arcs which have zero and first derivative continuity at their junctions. A parabolic section is such a surface function and the surface 12 may be caused to approximate a parabolic section. The accuracy of approximation depends on the number of chambers used and their spacing.

The above described apparatus is capable of concentrating parallel radiation (i.e. solar energy, radio waves, etc.) incident onto the reflective surface 12 into a straight line parallel to supports 14 and 16. For a given angle of the incident radiation to the plane of the apparatus A, a locus of points exists which describes possible focal points. If, as will normally be the case, the absorber tubes 10 are constrained to move along a separate locus of points, such as a circle, there exists one point where the locus of focal points and the locus of absorber points intersect for a given incident angle of radiation. The absorber tubes 10 and the surface 12 are accordingly coordinated so as to make their respective loci intersect. Adjustment of the shape of surface 12 is accomplished by varying the various pressure ratios between the chambers and ambient air pressure and by varying the ratio of the length of the surface 12 to that of the spacing between supports 14 and 16.

The foregoing disclosure and description of the preferred embodiment are illustrative and explanatory thereof and various changes in the size, shape and materials as well as in the details of the preferred embodiment may be made without departing from the spirit of the invention. Specifically, for example, variations are possible in the number of compartments used, the method of pressure isolation among the compartments, and the method of providing a variable length ratio of the length of the reflective surface to the width of the mirror. If desired, several arrays of surfaces and heat absorbers may be installed adjacent each other.

I claim:

1. A solar energy apparatus, comprising:
   (a) absorber means for absorbing solar flux;
   (b) flexible reflective means for receiving incident solar flux and concentrating same on said absorber means;
   (c) means for mounting said sheet of reflective material on a surface to receive solar flux;
   (d) means for moving the position of said absorber means with respect to said flexible reflective means according to the flux distribution of the solar flux received by said absorber means; and
   (e) means for adjusting the shape of said flexible reflective means according to the position of said absorber means, said means for adjusting comprising:
      (1) a plurality of adjacent compartments formed beneath a plurality of adjacent sections of said flexible reflective means;
      (2) means for controlling the pressure in said compartments to control the curvature of said sections of said flexible reflective means;
      (3) means for adjusting the cross length of said flexible reflective means relative to the width between said mounting means; and
      (4) computer means for coordinating said means for adjusting the cross length and said means for controlling the pressure to control the shape of said flexible reflective means, and
   (f) means for pressure isolation between said compartments.

2. The apparatus of claim 1, further including:
   initial locator means for forming an initial indication of the approximate angle of the sun with respect to said flexible reflective means.

3. The apparatus of claim 2, wherein said initial locator means comprises:
   plural solar cells each mounted at right angles with respect to the others and forming an output signal proportional to the amount of solar flux received.

4. The apparatus of claim 1, wherein said flexible reflective means comprises:
   an elongate quadrilateral sheet having a specularly reflective surface;
   means for mounting said sheet of reflective material on a stationary surface to receive solar flux.

5. The apparatus of claim 1, wherein said means for adjusting includes:
   means for pressure isolation between said compartments.

6. The apparatus of claim 5, further including:
   means for sensing the pressure differential between ambient air pressure and each of said plurality of compartments.

7. The apparatus of claim 1, wherein said absorber means comprises:
   means for converting the concentrated solar flux into another form of energy.

8. The apparatus of claim 1, wherein said means for moving comprises:
   (a) motor means for adjusting the position of said absorber means with respect to said flexible reflective means; and
   (b) control means for controlling the operation of said motor means.

9. The apparatus of claim 8, wherein said control means includes:
   means for sensing the flux distribution on said absorber means.

10. The apparatus of claim 1, wherein said means for adjusting comprises:
    means for detecting the position of said absorber means with respect to said flexible reflective means.

11. A method of concentrating solar energy on a solar flux absorber with a flexible reflective surface, comprising the steps of:
    (a) moving the position of the absorber with respect to the flexible reflective surface according to the flux distribution on the absorber; and
    (b) adjusting the shape of the flexible reflective surface according to the position of the absorber by performing the steps of:
       (1) controlling the pressure in adjacent compartments formed beneath the flexible reflective surface to control the curvature of the surface;
       (2) adjusting the cross length of the flexible reflective surface relative to the width of structure between which the reflective surface is mounted; and
       (3) coordinating said steps of adjusting of the cross length and controlling the pressure to control the shape of the flexible reflective surface.

12. The method of claim 11, further including the step of:
    forming an initial lindication of the approximate angle of the sun with respect to the flexible reflective surface.

13. The method of claim 11, wherein the flexible reflective surface has plural compartments thereneath and wherein said step of adjusting comprises:
    controlling the pressure within the compartments to control the shape of the flexible reflective surface.

14. The method of claim 13, further including the step of:
    sensing the pressure differential between ambient air pressure and the compartments.

15. The method of claim 11, wherein said step of moving includes the steps of:
    (a) sensing the incident heat flux on the absorber; and
    (b) moving the absorber in a direction to maximize the incident heat flux on the absorber.

16. The method of claim 11, wherein said step of adjusting includes the step of:
    detecting the position of the absorber with respect to the flexible reflective surface.

17. The method of concentrating solar energy on a solar flux absorber with a flexible reflective surface, comprising the steps of:
- (a) adjusting the flexible reflective surface to approximate a parabolic section which corresponds to the incident solar flux angle and which further has a focal point which conincides with the locus of possible solar flux absorber positions said adjusting comprising the steps of:
  - (1) controlling the pressure in adjacent compartments formed beneath the flexible reflective surface to control the curvature of the surface;
  - (2) adjusting the cross length of the flexible reflective surface relative to the width of structure between which the reflective surface is mounted;
  - (3) coordinating said steps of adjusting of the cross length and controlling the pressure to control the shape of the flexible reflective surface; and
- (b) moving the position of the absorber with respect to the flexible reflective surface in order to position the absorber at the focal point of the parabolic section.

18. An apparatus for concentrating solar energy on a solar flux absorber with a flexible reflective surface, comprising:
- (a) means for adjusting the flexible reflective surface to approximate a parabolic section which corresponds to the incident solar flux angle and which further has a focal point which coincides with the locus of possible solar flux absorber positions said means for adjusting comprising:
  - (1) a plurality of adjacent compartments formed beneath a plurality of adjacent sections of the flexible reflective surface;
  - (2) means for controlling the pressure in said compartments to control the curvature of said sections of the flexible reflective surface;
  - (3) means for adjusting the cross length of the flexible reflective surface relative to the width between said mounting means; and
  - (4) computer means for coordinating said means for adjusting the cross length and said means for controlling the pressure to control the shape of the flexible reflective surface; and
- (b) means for moving the position of the absorber with respect to the flexible reflective surface in order to position the absorber at the focal point of the parabolic section.

* * * * *